Dec. 21, 1937. E. G. STAUDE Re. 20,600

FLUID POWER CONTROLLING MECHANISM

Original Filed July 3, 1929 13 Sheets-Sheet 1

INVENTOR
EDWIN G. STAUDE
BY Paul H. Moore
ATTORNEYS

Dec. 21, 1937. E. G. STAUDE Re. 20,600

FLUID POWER CONTROLLING MECHANISM

Original Filed July 3, 1929 13 Sheets-Sheet 2

INVENTOR
EDWIN G. STAUDE
BY Paul, Paul & Osborne
ATTORNEYS

Dec. 21, 1937. E. G. STAUDE Re. 20,600

FLUID POWER CONTROLLING MECHANISM

Original Filed July 3, 1929 13 Sheets-Sheet 3

INVENTOR
EDWIN G. STAUDE
BY Paul Paul & Moore
ATTORNEYS

Dec. 21, 1937. E. G. STAUDE Re. 20,600
FLUID POWER CONTROLLING MECHANISM
Original Filed July 3, 1929 13 Sheets-Sheet 4
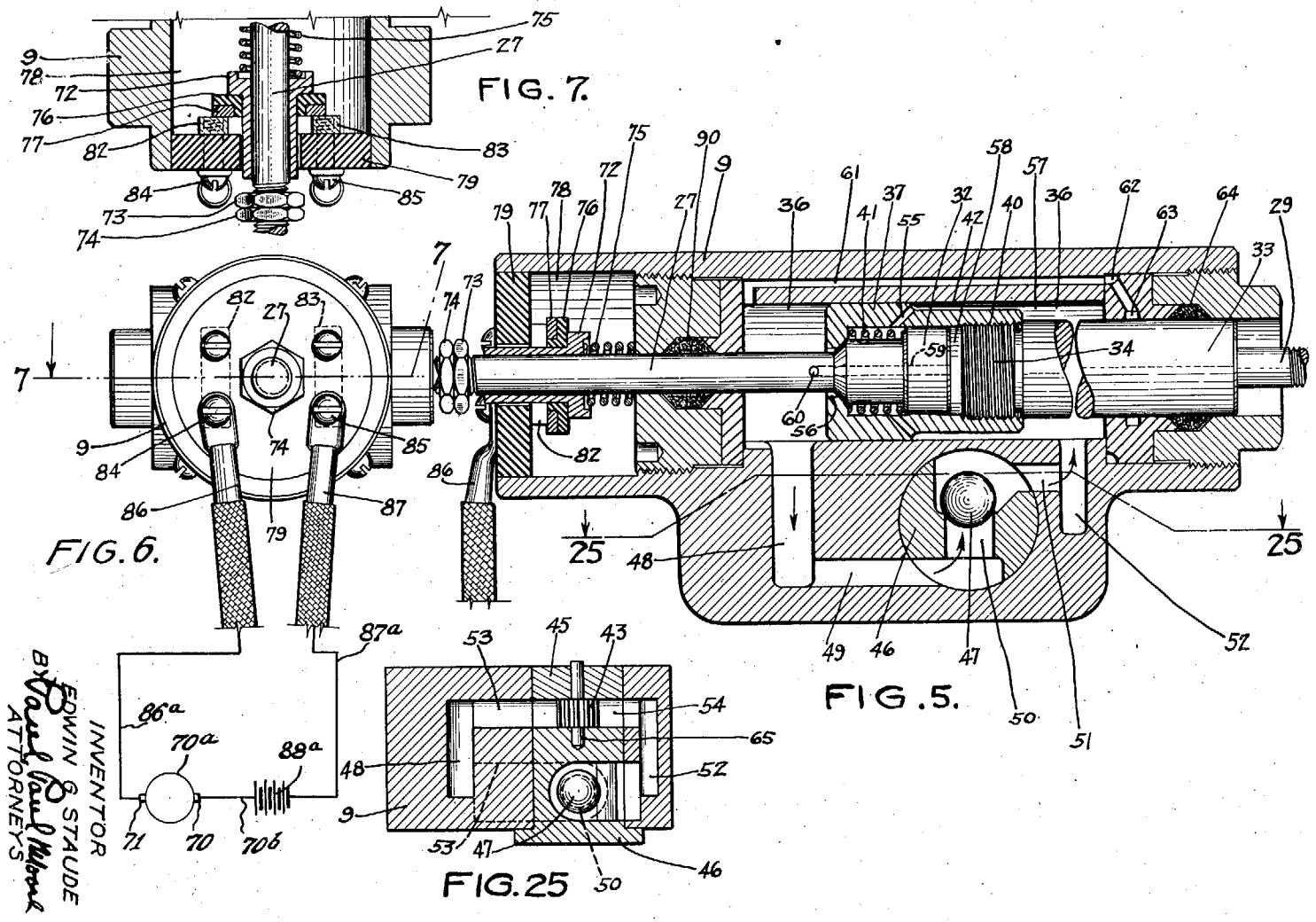

Dec. 21, 1937. E. G. STAUDE Re. 20,600

FLUID POWER CONTROLLING MECHANISM

Original Filed July 3, 1929 13 Sheets-Sheet 5

INVENTOR
EDWIN G. STAUDE
BY Paul Paul & Moore
ATTORNEYS

Dec. 21, 1937. E. G. STAUDE Re. 20,600

FLUID POWER CONTROLLING MECHANISM

Original Filed July 3, 1929 13 Sheets-Sheet 6

INVENTOR
EDWIN G. STAUDE
BY Paul Paul Kilbourne
ATTORNEYS

Dec. 21, 1937. E. G. STAUDE Re. 20,600

FLUID POWER CONTROLLING MECHANISM

Original Filed July 3, 1929 13 Sheets-Sheet 7

INVENTOR
EDWIN G. STAUDE
BY Paul, Paul & Moore
ATTORNEYS

Dec. 21, 1937. E. G. STAUDE Re. 20,600

FLUID POWER CONTROLLING MECHANISM

Original Filed July 3, 1929 13 Sheets-Sheet 8

INVENTOR
EDWIN G. STAUDE
BY Paul, Paul & Moore
ATTORNEYS

Dec. 21, 1937. E. G. STAUDE Re. 20,600

FLUID POWER CONTROLLING MECHANISM

Original Filed July 3, 1929 13 Sheets-Sheet 9

INVENTOR
EDWIN G. STAUDE
BY Paul Paul Moore
ATTORNEYS

FLUID POWER CONTROLLING MECHANISM

Original Filed July 3, 1929 13 Sheets-Sheet 10

INVENTOR
EDWIN G. STAUDE
BY Paul Paul Moore
ATTORNEYS

FLUID POWER CONTROLLING MECHANISM

Original Filed July 3, 1929 13 Sheets-Sheet 11

INVENTOR
EDWIN G. STAUDE
BY Paul, Paul & Moore
ATTORNEYS

Dec. 21, 1937. E. G. STAUDE Re. 20,600

FLUID POWER CONTROLLING MECHANISM

Original Filed July 3, 1929 13 Sheets-Sheet 12

INVENTOR
EDWIN G. STAUDE
BY Parker, Carter & Markham
ATTORNEYS

Dec. 21, 1937. E. G. STAUDE Re. 20,600
FLUID POWER CONTROLLING MECHANISM
Original Filed July 3, 1929 13 Sheets-Sheet 13
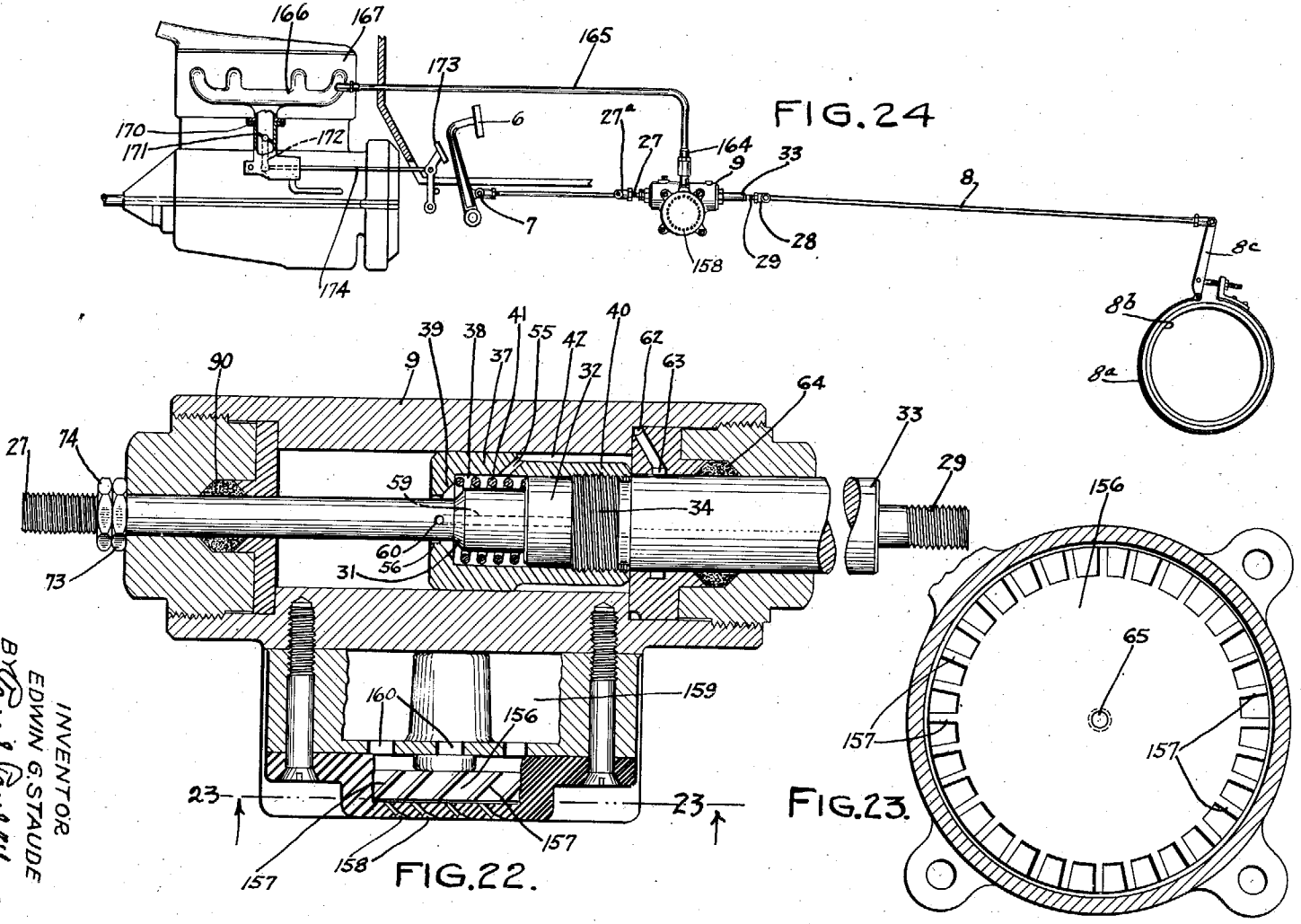

Reissued Dec. 21, 1937

Re. 20,600

UNITED STATES PATENT OFFICE 20,600

FLUID POWER CONTROLLING MECHANISM

Edwin G. Staude, Minneapolis, Minn.

Original No. 1,921,590, dated August 8, 1933, Serial No. 375,846, July 3, 1929. Application for reissue December 26, 1933, Serial No. 703,985

47 Claims. (Cl. 188—152)

This invention pertains to improvements in dual-powered brake controlling devices, and is related to my Reissue Patent No. 15,906, and to my Patent No. 1,785,052, issued December 16, 1930.

This invention relates to improvements in dual-powered fluid-actuated mechanism, for assisting the manual effort in setting brakes on the wheels, and thereby controlling the deceleration of the vehicle with less physical effort.

One of the objects of my present invention is to provide an improved power application for maintaining a fluid pressure when required.

Other objects are to provide a power application which shall be in instant service only when required; to provide a mechanism that may be more easily applied to existing vehicles; to provide a greatly simplified construction; to devise a unit that is capable of operating at high pressure thereby reducing its size for the work performed; and to provide a simple method of mounting the mechanism which may readily be attached in the brake line, without interfering with existing cross members, floor boards, and so forth.

Other objects, advantages and features of the invention will appear from the following detail description.

Features of the invention include all details of constructions, and combinations and sub-combinations of the parts disclosed in the drawings.

In the accompanying drawings, forming a part of this application

Figure 5 is a longitudinal vertical section on line 5—5 of Figure 8, looking in the direction of the arrow;

Figure 6 is an end view of Figures 4 and 5 showing the electrical contact section;

Figure 7 is a plan section on line 7—7 of Figure 6, looking in the direction of the arrow;

Figure 22 is a horizontal section on line 22—22 of Figure 19;

Figure 23 is a vertical section on line 23—23 of Figure 22;

Figure 24 is a diagrammatic view showing my vacuum-controlled device in relation to a brake pedal, intake manifold of a motor, brake rod connection and conventional brake; and Figure 25 is a plan section on line 25—25 of Figure 5 illustrating the circulation passages including the by-pass with the check valve controlling it.

Figure 1:
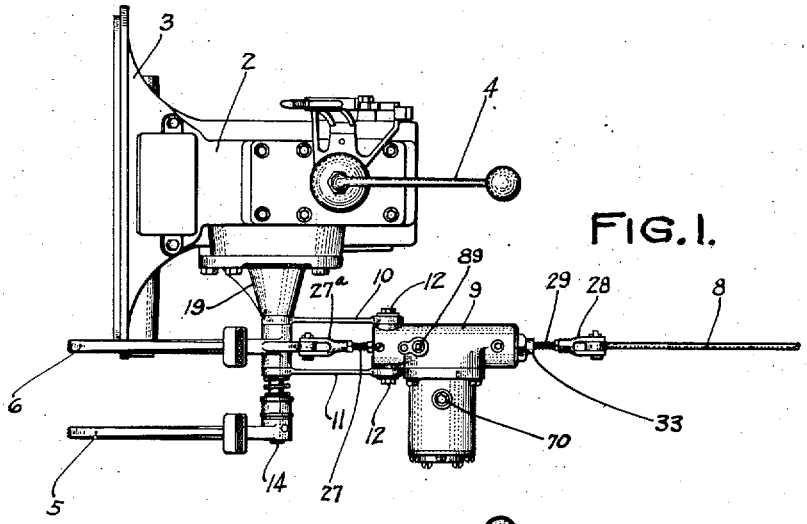
Figure 1 is a top plan view of a motor vehicle transmission, supporting the clutch and brake pedal bracket to which my invention is applied.

The invention may be considered as an improvement on my Reissue Patent No. 15,906.

In the application of a hydraulic pump for this purpose, it is common to provide one of the pump gears on the transmission shaft. Since this shaft is usually 1⅜ inches in diameter, it follows that the diameter of the pump gear cannot well be anything under three inches. In order to get the required proper volume of one cubic inch per revolution of the propeller shaft, it involves a pump gear face of about half an inch. The coacting gear must necessarily be of the same size in order to keep the speed down when the car runs at higher speeds.

When power take-off from the transmission is used, it is necessary to provide sufficient fluid capacity to give ample displacement or movement of the mechanism for assisting in applying the brakes at a time when the car is practically at a standstill. Therefore, the pump mechanism must have volume sufficient to cause the proper action at the very slowest speeds, without lagging back of the manual effort. At this time, the pump gear revolves less than fifty revolutions per minute. Because of this slow speed, high pressure is impractical due to fluid leaking past the gear teeth at such very slow speeds. In order to have a pump of the proper capacity for the very lowest speeds, it is evident that it will have to have very much greater capacity than necessary at speeds thirty miles per hour or greater.

By the use of the invention herein described, the above named objections are entirely overcome for the reason that, instead of the pump gear revolving at less than fifty revolutions per minute, just before the stopping period and causing a maximum fluid pressure not to exceed one hundred fifty pounds, very much smaller pump gears revolving at the rate of ten thousand revolutions per minute and developing a pressure of more than five hundred pounds per square inch are used, and therefore adequate power is assured whatever the speed of the car. This is an important feature of my invention. This for the reason that instead of taking the power from the transmission shaft, the speed of which reduces proportionately with the speed of the vehicle, I use the current from the storage battery through a small high speed motor, running ten thousand revolutions per minute, using less than one hundred watts and which generates a pressure of over five hundred pounds per square inch with a pair of pump gears three-eighths of an inch pitch diameter, one-eighth of an inch, face, twelve teeth, thirty-two pitch.

Where it is undesirable to use the current from the storage battery, I use a vacuum-operable turbine for driving the pump gears at ten thousand revolutions per minute, obtaining the vacuum effect by connecting the device by means of a three-eighths inch copper tubing with the intake manifold of the motor. Of course, this connection may be made at any part where suction effects can be obtained. Moreover, the suction effects may be produced in other ways than by connection with the engine. The use of the vacuum, either produced as the result of the engine operation, or otherwise, is considered an important feature of the invention. By running the pump gears at high velocity and by obtaining the high pressure, I am able to obtain either more pulling power on the brake rod with a given size unit, or obtain the same pulling power on the brake rod with a proportionately smaller unit. Inasmuch as the size and weight of any mechanism on a motor vehicle are important considerations, the advantages obtained by the construction herein are additionally important. By use of the means herein a small unit of small weight is produced. Another important feature is that the device is connected as a part of the brake connection in the brake line. The power to the device can be obtained through hollow flexible connection. Another important feature is the fact that when a motor is used it is carried by, or as a part of, the unit. Another important feature is that a very small motor can be and is used.

I have shown that it takes a pumping capacity of one cubic inch per one revolution of the pump gear where the pump is driven from and at propeller shaft speed. If for every revolution of the propeller shaft one cubic inch is circulated in the system, running at thirty miles per hour, which is the equivalent of fifteen hundred revolutions per minute, there would circulate fifteen hundred cubic inches or about sixty-five gallons of fluid per minute whether the brake is used or not.

Under my present invention herein disclosed, the fluid circulates only when the brake is being applied, a feature of the invention. I can do this only because of the small volume required, but the high speed of the pump gears and the high pressure with the pump gears running at ten thousand revolutions per minute I am able to reduce the size of the gears proportionately to one-eighth of an inch face and three-eighths of an inch pitch diameter so that instead of obtaining a volume of one cubic inch per revolution, I actually obtain only .009 of a cubic inch but running ten thousand revolutions per minute, or one hundred sixty-six revolutions per second, I actually get one and one-half cubic inch fluid displacement per second, and because of the high pressure of five hundred pounds per square inch, I need only one-half a cubic inch displacement to give me the same braking effort as formerly required with one and one-half cubic inches owing to the difference in pressure. Since I am able to obtain one and one-half cubic inches displacement per second at one hundred sixty-six revolutions per second and since only one-half a cubic inch is required to set the brakes, it follows that I can set the brakes in one-third of a second which is faster (an important feature of the invention) than brakes can be set by manual effort, therefore there can be no lagging in brake effort. A pump gear one-eighth of an inch face and three-eighths of an inch pitch diameter has a pumping face area of .0078 inch. Multiply this by five hundred pounds pressure and .1875 inch radius of pump gear equals seven pounds torque at three-sixteenths of an inch radius, or one and one-half inches pound torque to obtain five hundred pounds pressure, practically instantaneously; another important feature.

For the purpose of computing vacuum values on a motor intake manifold when the butterfly valve is closed for operating windshield wipers, vacuum tanks, and so forth, ten pounds vacuum is generally conceded to be available. Where I desire to drive the pump by a vacuum turbine I provide a small three inch diameter turbine wheel with a quarter inch face. I also provide thirty equally spaced air inlet holes one-sixteeenth of an inch diameter on a one and three-eighths inch radius. The area of one-sixteeenth inch round is .003 inch times thirty holes equals .09 area, assuming the full vacuum value of ten pounds I can deliver actually a maximum of four inch pounds torque when only one and one-half inch pound torque is required for five hundred pounds fluid pressure.

To use electric current from the battery, I have found in practice that in order to secure a one and one-half inch pound torque at ten thousand revolutions per minute, a motor about one hundred watts capacity is required, which is about twice the capacity used in the ordinary electric motor car horns or windshield wipers, and like these motors full speed is obtained almost instantly. Both the vacuum-turbine and the electric motor run only when the brake is in use, and there is no waste of power; an important feature of the invention. The ratio between brake pedal movement to brake rod movement is usually about three to one, so that a pressure of one hundred pounds applied to the foot pedal causes a pull on the brake rod of three hundred pounds, therefore, for motor cars generally it is sufficient if the device be so designed as to be capable of exerting a pull on the brake rod up to two hundred and fifty pounds, in addition to that manually exerted. Of course, the present invention need not depend on any appreciable amount of manual or other power assistance.

This invention lends itself admirably to use with a device in which the power can be applied proportionately and progressively such as shown in my Patent No. 1,785,052, issued December 16, 1930. It is quite evident that a brake power mechanism where the power is not absolutely under perfect control at all times, but may either be "all on" or "all off", is absolutely unsafe and impractical.

Figure 13:
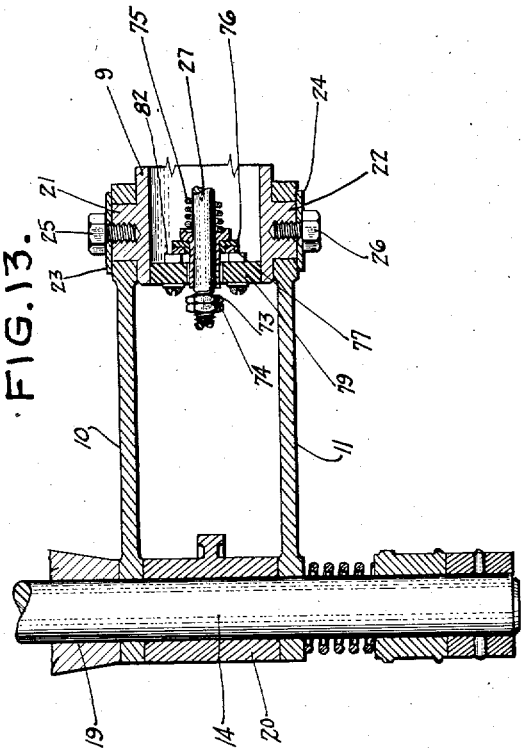
Figure 13 is a detailed section on line 13—13 of Figure 2 showing the manner of mounting my invention when used in connection with the brake line as in Figures 1 and 2.
Figure 14:
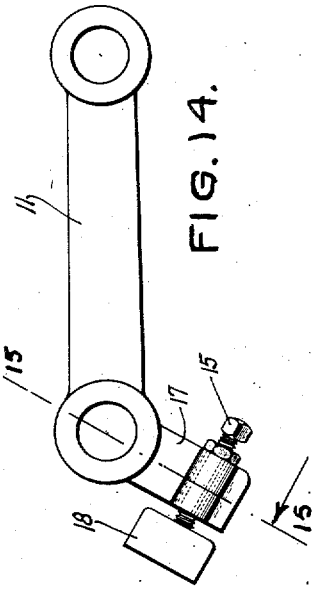
Figure 14 is a detail of one of the supporting links shown in Figure 13.

In the drawings, 2 represents an ordinary motor car transmission case, having the usual bell fly wheel housing 3, and the gear shift lever 4, clutch pedal 5, and the ordinary brake pedal 6. Between the usual brake rod clevis connection 7 and the brake rod 8, I mount my brake control unit generally designated 9, additionally and movably supporting same from links 10 and 11, which are pivoted at one end as at 12, on opposite sides of the member 9, and at the other end to shaft 14, see Figures 1, 2, 13, 14 and 15. The brake band is indicated at $8^a$, the brake drum at $8^b$ and the band operating lever at $8^c$. To line up and locate the position of the links 10 and 11, I provide the set screw 15 passing through a threaded portion of a depending arm 17 on the links 10 and 11. The set screw passes through the depending arm 17, and bears against lug 18 which is formed on the pedal bracket 19 secured to the transmission case 2, see Figure 2. As will be noted in Figure 13, the links 10 and 11, are located on each side of the brake pedal bearing 20, and at the opposite end the links 10 and 11 fit over suitable lugs 21 and 22 formed on the member 9. To keep the links in position, I provide washers 23 and 24 held in place by cap screws 25 and 26.

A feature, therefore, relates (see Figure 1) to the linking of a power unit, by link means connecting a casing or operating chamber to the brake pedal shaft bracket.

Figure 2:
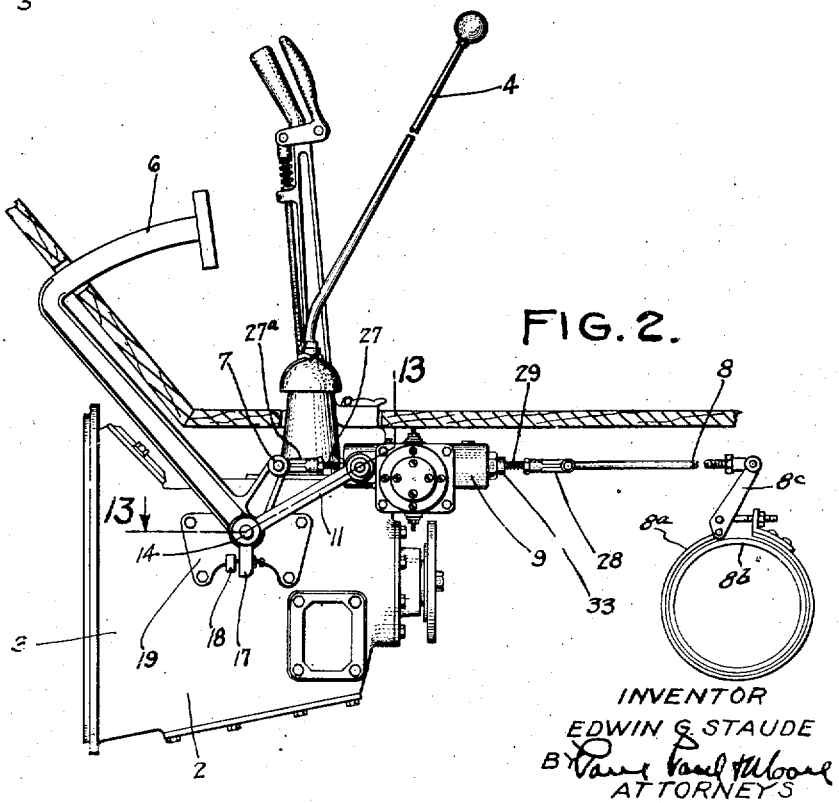
Figure 2 is a side elevation of Figure 1.
Figure 3:
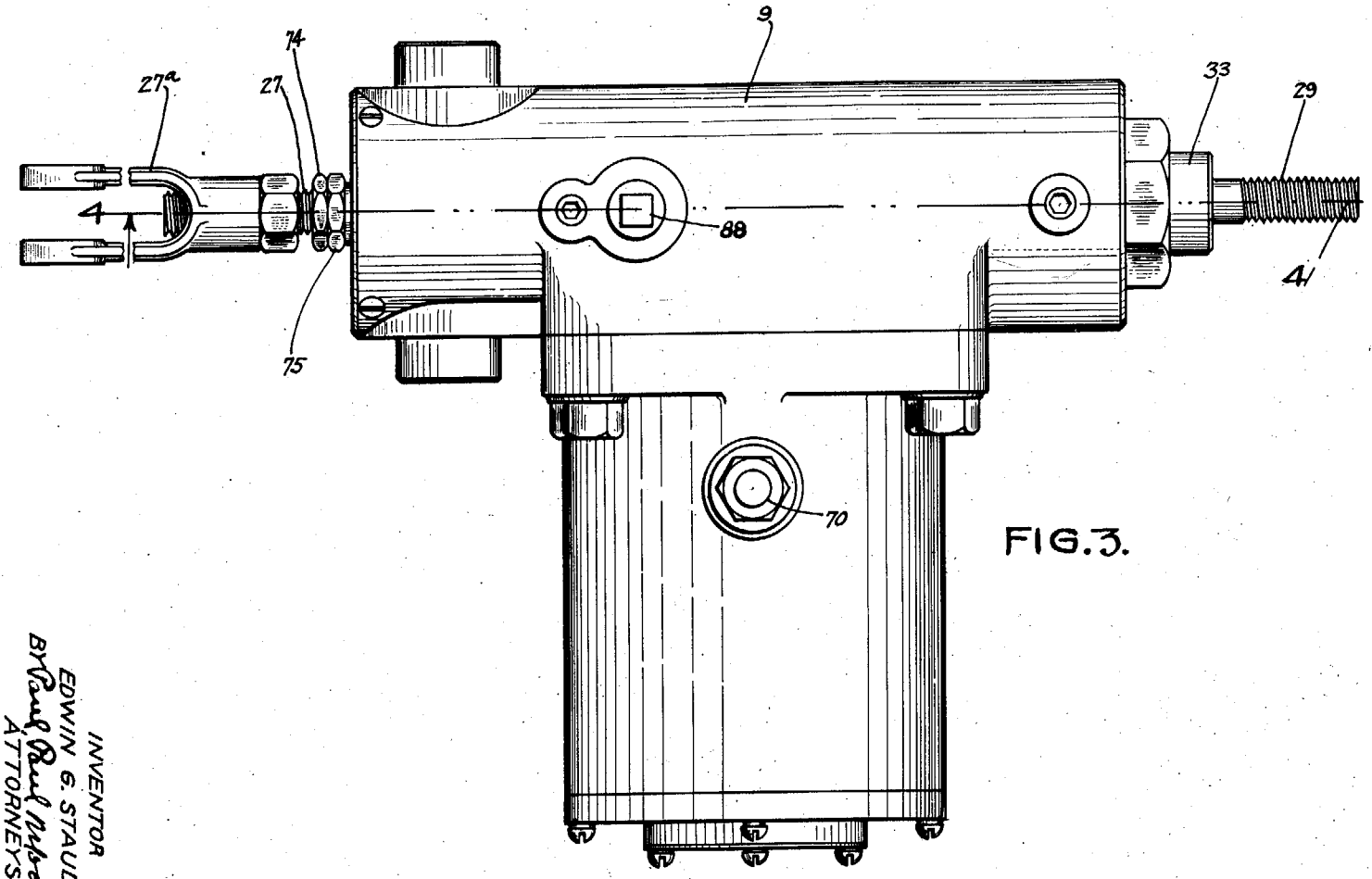
Figure 3 is a top plan view of the mechanism embodying my invention.
Figure 4:
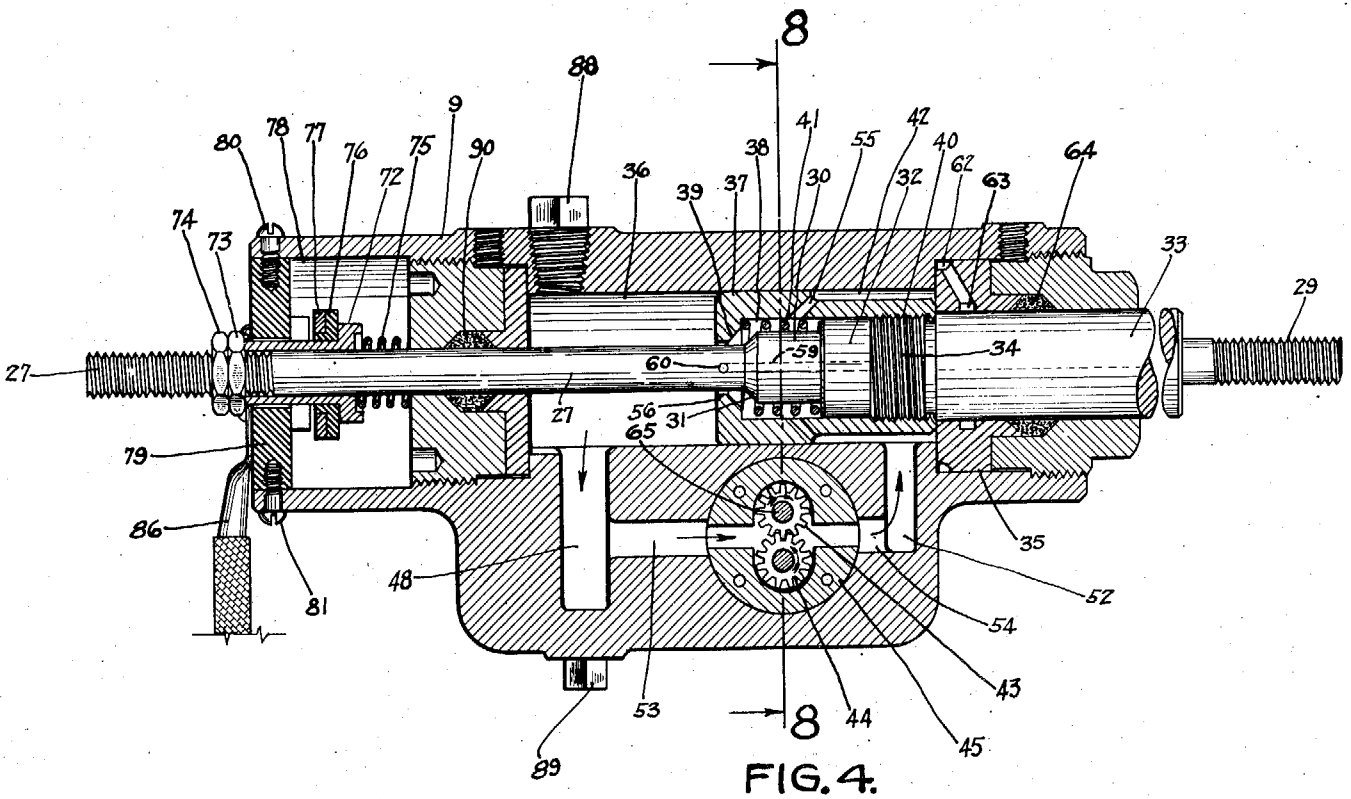
Figure 4 is a vertical section on line 4—4 of Figures 3 and 8, looking in direction of the arrow.

Referring to Figures 1, 2 and 4, a clevis $27^a$ is pivoted as at 7 to the pedal 6, and is secured to the shaft stem 27 as shown, the threaded connection permitting adjustment. At the opposite side of the casing 9 there is a clevis 28 pivoted at one end to the brake rod 8 and adjustably secured by threading to the threaded portion 29 of the element 33. From the foregoing description and also by reference to Figure 4, it is clear that by depressing the pedal 6, a pull will be exerted on the brake rod 8, through the clevis connections $27^a$—28, parts 29 and 27, and intermediate connections now to be described. Rod 27 is integral or has formed upon it an enlarged portion 30 tapered at the point of junction to provide a seat 31. There is also provided an enlarged portion 32 larger than the portion 30, and providing a circumferential shoulder as a spring seat. The threads 29 are arranged on a reduced portion of a stem element which includes an enlarged portion 33 having a threaded end 34. The end of the element 32 normally abuttingly engages the end 34 of element 33. Within the bore 36 of the casing 9 is a hollow piston-like valve seat member 37 having a bore 38, and counterbored to provide a seat 39 with which the seat 31 of the member 30 is cooperable, to control fluid flow in the pressure system. The opposite end of the bore 38 is threaded as at 40 to receive the threads 34 on the member 33, and thus secures the casing for movement with 33. A coil spring 41 abuts the wall of the bore 38 and the shoulder formed by element 32, and tends to move the parts to the position shown in Figure 4 with the end of the element 32 abutting the end of the element 33 as a stop, and with the end of the element 37 abutting the face of stuffing box member 35. The rear portion of the hollow valve seat member 37 is exteriorly counter-turned, and is therefore of smaller diameter to provide passage 42 which permits free flow of fluid around one end portion. This circumferential passage forms part of a fluid circuit hereafter to be described, and including bore 36, passage 42, passage 55, bore 38 and opening 56 of element 37 (of greater diameter than shaft 27).

Figure 8:
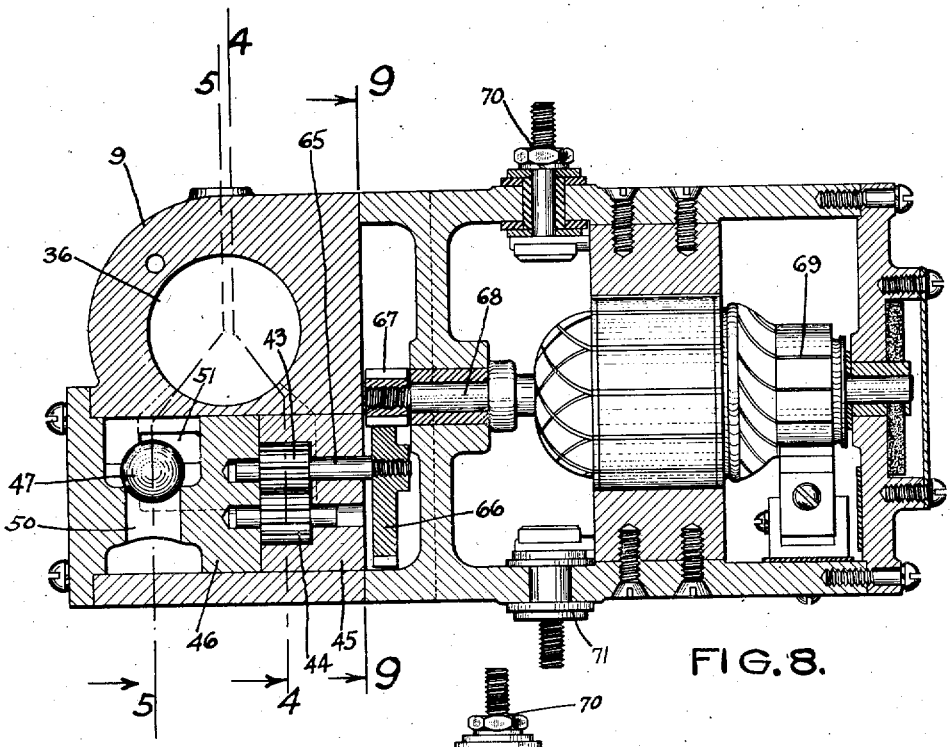
Figure 8 is a section on line 8—8 of Figure 4.
Figure 9:
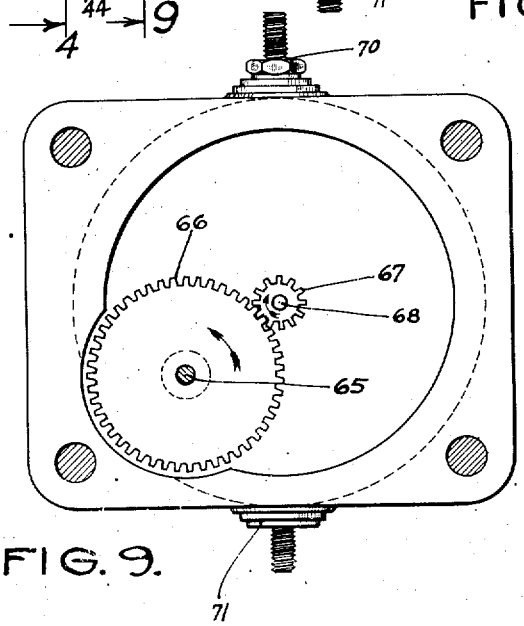
Figure 9 is an end view on line 9—9 of Figure 8 looking in the direction of the arrow.

A series of passages are in this instance included in a fluid circuit, and circulation in this circuit is controlled by a pair of pump gears 43—44 mounted in castings 45—46, see Figures 4 and 8. The casting 46 is provided with a passage controlled by a check valve 47, see Figures 5 and 8. These structures are features of the invention. The check valve is used so that if for any reason the pump gears 43—44 stop during the period when braking movement is needed, or during that movement, the fluid trapped in front of the movable valve casing 37 can be by-passed through the passages in direction of the arrows, see Figure 5. The passages are indicated at 49, 50, 51, 52 and passage 52 leads into the rear of the movable valve element 37, which operates in bore or chamber 36. The ball check valve will, however, prevent the flow of the fluid in the opposite direction so that when the pump gears generate a pressure the ball 47 will rest securely on its seat. This is a valuable feature.

Referring to Figure 4: As the small pump gears revolve in the direction indicated by the arrow, and whenever 31 is not seated at 39, the fluid in the forward part of the chamber 36 will flow into the passage 48, passage 53, around the pump gears 43 and 44, out through the passage 54, into the passage 52, around the space 42, through the angular passage 55, into the space around the member 30, past the valve 31, and the seat 39, through the opening 56, around the member 27 back into the forward part of the chamber 36, when the circuit will be completed.

Figure 5 shows the operation when braking, in which the valve is moving forwardly with the valve 31 seated on its seat 39 and spring 41 under compression. Since the fluid cannot pass the valve and seat, pressure is immediately built up back of the slidable valve seat member 37 at the point 57, this pressure acting against the enlarged portion 32 and exerting a back pressure on the rod 27 tending to open the space between the valve 31 and its seat 39.

In practice, I provide the proportionate area against which this back pressure acts as substantially twenty per cent of the total available area against the back of the valve seat member 37. The purpose here is substantially the same as in my Patent No. 1,785,052, except the construction is greatly simplified, and costs of manufacture reduced. The purpose is that of obtaining the necessary progressive "feel" on the brake pedal, which shall always be proportional in the ratio of practically five to one of the additional "booster"

effort of the actual fluid pressure at the point 57.

In order to provide an outlet for the fluid which may accumulate at the point 58, a hole 59 is drilled in the center of the members 30 and 32 as shown in dotted lines, Figures 4 and 5, and this hole connects with a hole drilled crosswise through the rod 27. This hole connects with the forward end of the chamber 36 on the low pressure side of the unit. There is also provided a channel 61 connecting the low pressure side of the unit with any leakage that may accumulate at the points 62 and 63 in the bearing and stuffing box 64.

Referring to Figure 8, the pump gear 43 is formed integral with the shaft 65 on the end of which is secured a small spur gear 66, meshing into this spur gear is a pinion 67 secured to the rotor shaft 68 of a small electric motor having the usual commutator 69 and terminals 70 and 71. From the description just given it is clear that when a circuit is closed across terminals 70 and 71, the motor will instantly start, and through the action of the gears 67—66, shaft 65 and the pump gear 43—44, immediate circulation of the fluid will be obtained. Referring now to Figures 4, 5 and 7: In order to make and break this circuit automatically as a result of brake pedal action, the following means is provided: A sleeve 72 slides upon rod 27 and abuts one of a pair of nuts 73 and 74 properly adjusted on the rod 27. Spring 75 acts to move sleeve 72 toward said stop nuts. On the sleeve 72 is an insulating retainer ring 76 and secured to the retaining ring 76 is a brass ring 77. Secured in a counterbore 78, of the member 9, is the member 79 made of insulating material, and held in place by screws 80 and 81. Secured to the insulating material 79 are small copper blocks 82 and 83 connected by screws 84 and 85 which represent terminals for the connections 86 and 87.

Figure 11:
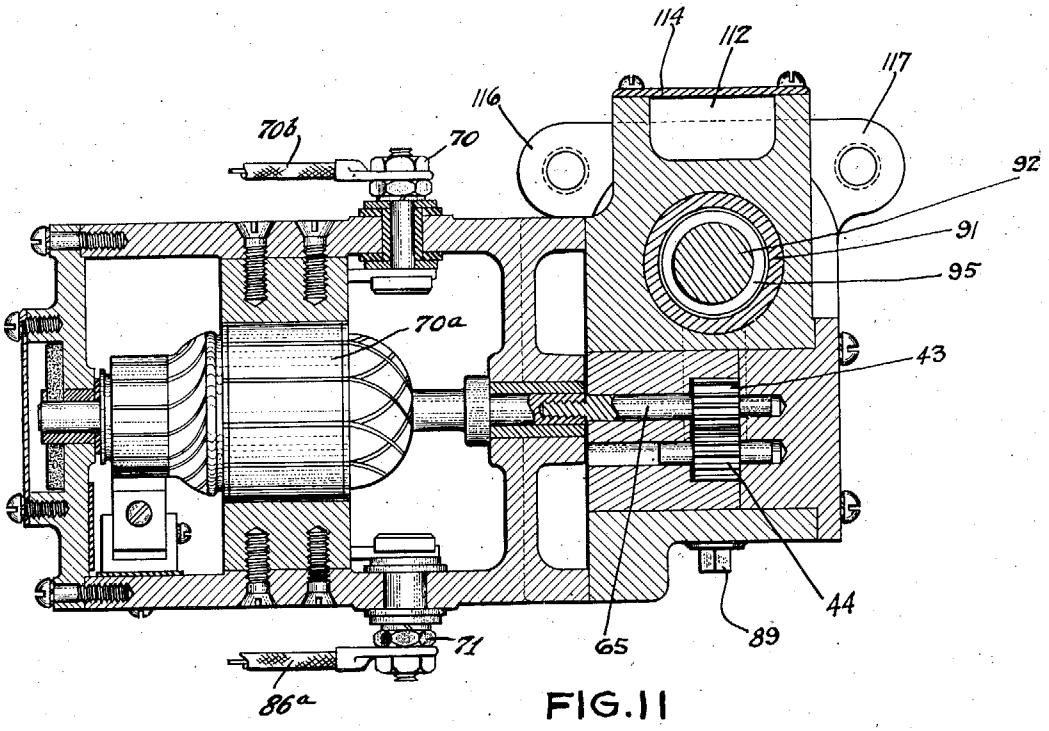
Figure 11 is a vertical cross-section from the line 11—11 of Figure 10 looking in the direction of the arrow.

The insulated wire 87 is connected by a suitable conductor 87ᵃ with one terminal of battery 88ᵃ. The opposite terminal of this battery is connected to the terminal 70 of motor 70ᵃ, by conductor 70ᵇ. The opposite terminal 71 of the motor is connected by conductor 86ᵃ with wire 86. The conductors 86ᵃ and 70ᵇ are also indicated in Figure 11.

From the description just given referring to Figures 4 and 5, 6 and 7, it is clear that as the pedal is depressed and the rod 27 moves in the operation of setting the brakes, jam nuts 73 and 74 will move away from the insulating member 79 and causing the sleeve 72 actuated by the spring 75, to bring the ring 77 in contact with the blocks 82 and 83, thus closing a circuit and instantly starting the motor which continues to run at full speed until the pedal is entirely released, which will bring the jam nuts 73 and 74 against the sleeve 72, compressing the spring 75 and breaking the circuit. For the purpose of filling chamber 36, and all of the passages, with fluid, (for example equal parts of glycerin and alcohol) a plug 88 is provided. Suitable packing 90 is provided around the rod 27.

Figure 10:
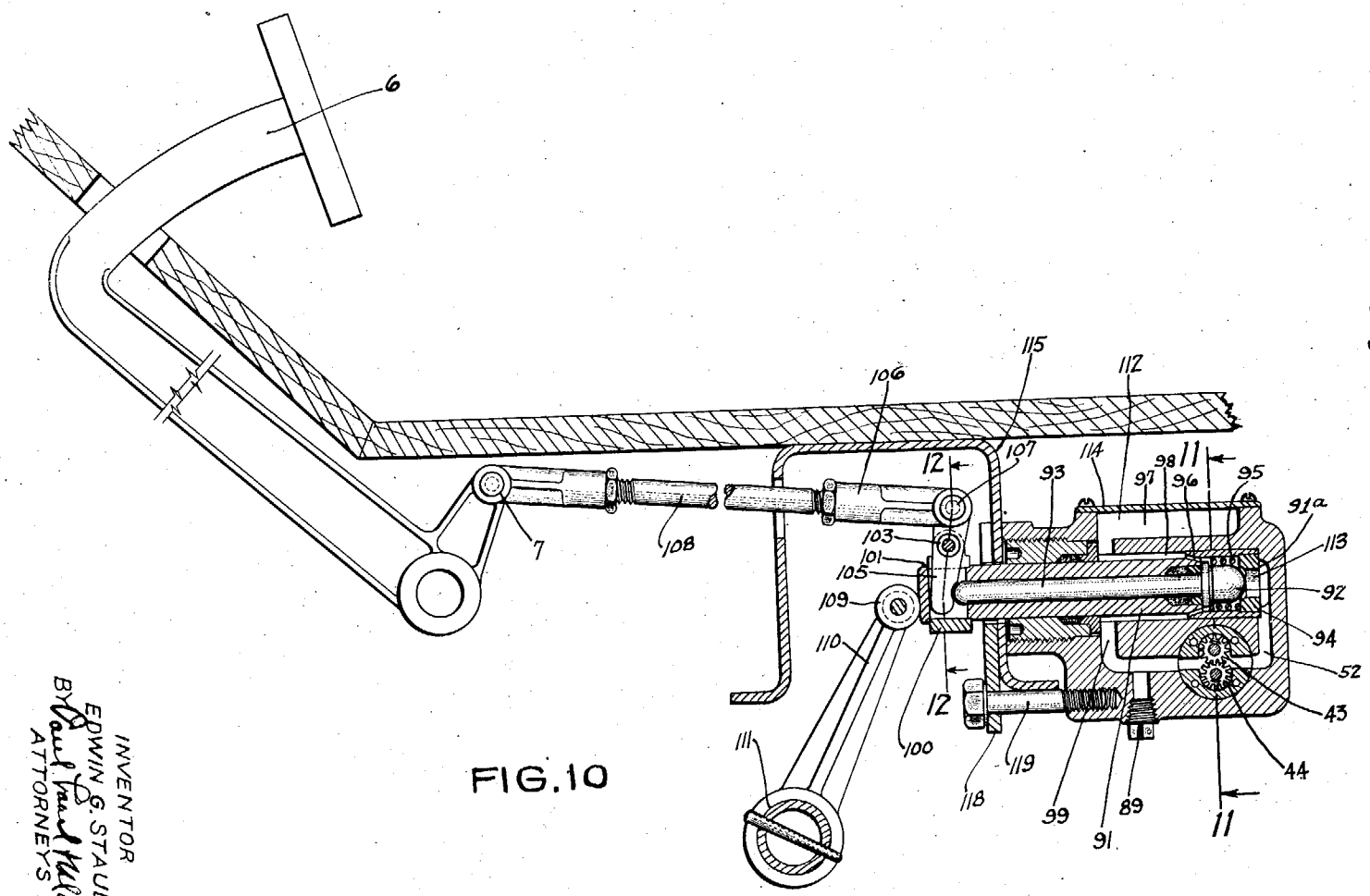
Figure 10 shows a vertical longitudinal section of a modified embodiment of my invention.
Figure 12:
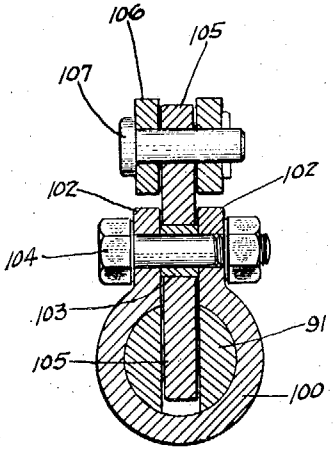
Figure 12 is a detailed section on line 12—12 of Figure 10.
Figure 15:
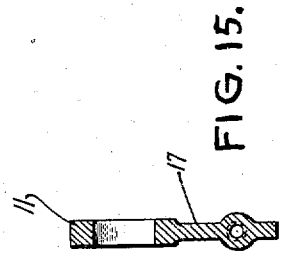
Figure 15 is a section of supporting link on line 15—15 of Figure 14.

In Figure 10 I have shown a modification of the construction just described, which is a feature of the invention. The form includes a tubular valve seat member 91, providing a seat 94 with which valve 92 cooperates. The valve has a stem 93. The valve 92 is adapted to be unseated by spring 95. The movable valve seat member 91 has passages 96, which are connected with the chamber 97 by passages 98 connecting in turn with passage 99, controlled by pump gears 43 and 44, and communicating with passage 52, in turn connecting with the forward end of the movable valve member 91. I provide a spring collar 100, fitting in a recess 101 on the end of the movable valve seat 91. The clamp collar has lugs 102 separated by bushing 103, see Figure 12, and held as a unit by a bolt 104. Mounted on the bushing 103 is a lever 105, one end of which bears against the member 93, the opposite end being connected to the clevis 106 by a pin 107. The clevis is secured to the rod 108, the end of which is connected at the point 7 to the usual brake pedal 6. As the pedal 6 is depressed, it will pull on the rod 108 and through the clevis connection 106 it will pull on the lever 105, which is pivoted at 103. The opposite end of the lever will push on the member 93 compressing the spring 95 and closing the valve 92 against the seat 94. If the fluid is in circulation, a pressure will immediately be set up to assist the manual effort. It will be understood that switch mechanism operable by the element 93 of Figure 10 may control the motor to set up fluid pressure in substantially the same manner as shown in Figure 4 wherein the element 27 operates the switch 77. A continuation of the pull on the rod 108 will cause the member 91 to bear against roller 109 on the arm 110, which is pinned to a cross shaft 111. This cross shaft 111 represents the brake shaft usually found on motor vehicles.

Although the construction shown in Figure 4 is applicable to most motor vehicles, there are some vehicles wherein, in order to make the installation in a practical manner, certain structural modifications are advisable. The construction shown in Figure 10 is adapted for use under conditions where lack of space prevents the use of other forms of the invention. This figure illustrates a "push type" installation with reverse valve motion, particularly applicable to certain trucks, where space is limited, and where low cost of installation is of major importance.

The regular brake rod fork 106 is connected as at 107 to a lever 105, which lever is pivoted on the bushing 103, mounted on valve seat element 91, and operates as follows: By pulling on the rod 108 the tubular valve seat member 91 is moved forwardly against the roller 109 on the arm 110 to rock the shaft 111. As soon as the brake-operating shaft 111 offers some resistance, the member 91 cannot move the arm 110 further without additional effort or pull on the rod 108. This additional pull causes the arm of lever 105 to rock on the bushing 103 and push on the valve stem 93 against the tension of the spring 95, toward seating position, and against the fluid pressure. By this action, pressure is built up in the passage 52, due to the restricted flow. This built-up pressure acts on the surface 91ᵃ of the exposed area of the tubular valve seat element 91 to move this element to, in turn, move the arm 110, in brake-applying direction.

When the arm 110 offers further resistance, a further pull on the rod 108 will still further compress the spring 95 and further reduce the opening between the valve 92 and the seat 94 which will further increase the pressure proportionate to the pull in the rod 108, until the final seating of the valve 92 on the seat 94, which results in setting up the maximum fluid pressure acting on the surface 91ᵃ.

Due to the manner of connecting the rod 108 to lever 105, all of the manual effort on the rod 108 can be directly and mechanically transmitted to the roller 109, in addition to the fluid pressure action or in the absence of any fluid pressure action.

In this device, part of the fluid pressure effort is thrown on the pedal 6 so that the operator may "feel" a proportionate increase in this pressure. The link 108 is pivoted to the lever 105 at a point over the pivotal point of the lever with the element 91. The lever not only serves the purpose of moving the valve 92 toward and against seat 94, but moves the stem 93 in a direction opposite to that of pedal motion. Because of the arrangement of the parts, and because the area of the end of the movable valve seat member 91 is greater than the area of the valve 92, it follows that all pressure on the member 91 is transmitted to the roller 109, and all pressure on the valve 92 is transmitted to the pedal, and thus the operator can "sense" the latter pressure and can control car deceleration smoothly without the danger of setting the brakes violently, or setting up a dangerous "grabbing" action.

The invention is not limited to use with a recirculating pressure system, or with a pressure system in which pump gears are used to create pressure, but may be used with any kind of a fluid pressure system. It will be noted that the valve 92 is moved to the right to closed position and in a direction opposite to that of fluid flow when the fluid is acting to obtain brake assisting power. It will also be noted that the power movement of the element 91 is in a direction opposite to the direction of closing movement of the valve 92 and in the same direction as fluid flow and in the same direction as that of pedal movement to brake applying position. The valve is also operable upon reaction in the linkage connections to obstruct the circulation of fluid as it leaves the operating chamber. In other words the valve 92 moves in a direction opposite to the direction of normal circulation of fluid. The valve is also operable upon reaction in the linkage connections to create a differential of pressure on the opposite sides of the actuating mechanism, and the valve moves in a direction opposite to the direction of normal circulation. By having the elements 91 and 93 project beyond the operating chamber at the same side, and by having the operating means 105, etc., also at a point outside of the chamber, connections with a control device such as a pedal are easily made. The relative directions of movements of the parts are valuable features, as well as the arrangement of the reacting means at one and the same end of both valving members.

A feature relates to the specific construction shown in Figure 10 by which connection with the valving means can be made at the outside of the case directly with a brake pedal link, and in which the casing can be arranged rearwardly of a brake shaft to operate the shaft by means of a brake shaft lever.

Another feature relates to the arrangement of Figure 10 in which the lever 105 (or functionally equivalent operating element) is mounted on the piston, with the lever adapted to close the valve when said lever is pulled in the same direction as that of piston movement when pressure-moved as a result of valve closure.

Another feature relates to the reacting relation of the operating means 105 to the valving elements 91 and 93 in which the direction of application of force to obtain assisting power is in the same direction as pedal brake motion, and motion of the force applying element 91, when applying braking assisting force.

Referring to Figure 11, I have shown the motor directly connected to the pump gear shaft 65, instead of using gears 66 and 67. Either construction is desirable depending on the size of the pump gears, fluid volume, required starting torque, and so forth. In the construction shown in Figures 10 and 11, I have dispensed with the check valve 47, by providing a reservoir or air chamber so that the fluid displaced by the movement of the movable valve members may pass into the air space 112 in the event that for some reason the pumping mechanism is inoperative. The general operation of the device just described is similar to that shown in Figures 4 and 5. In the first embodiment, the brake rod connection runs through the unit, whereas in the construction shown in Figures 10, 11 and 12, both the members comprising the movable valve and valve seat protrude from one end of the unit similar to the construction shown in my Patent No. 1,785,052. In the construction shown in Figure 10, there is provided the same proportionate fluid pressure against the pedal 6 through the action of the pressure against the valve 92 through the opening 113, as compared with the area of the total exposed end of the movable valve member 91.

A suitable filling plate 114 is provided to correspond with the filling plug 88, and a suitable drain plug 89 for the system is also provided. The unit is secured to a cross member 115 which is part of the motor car frame, by suitable lugs 116 and 117, the plate 118 and the bolt 119.

Figure 16:
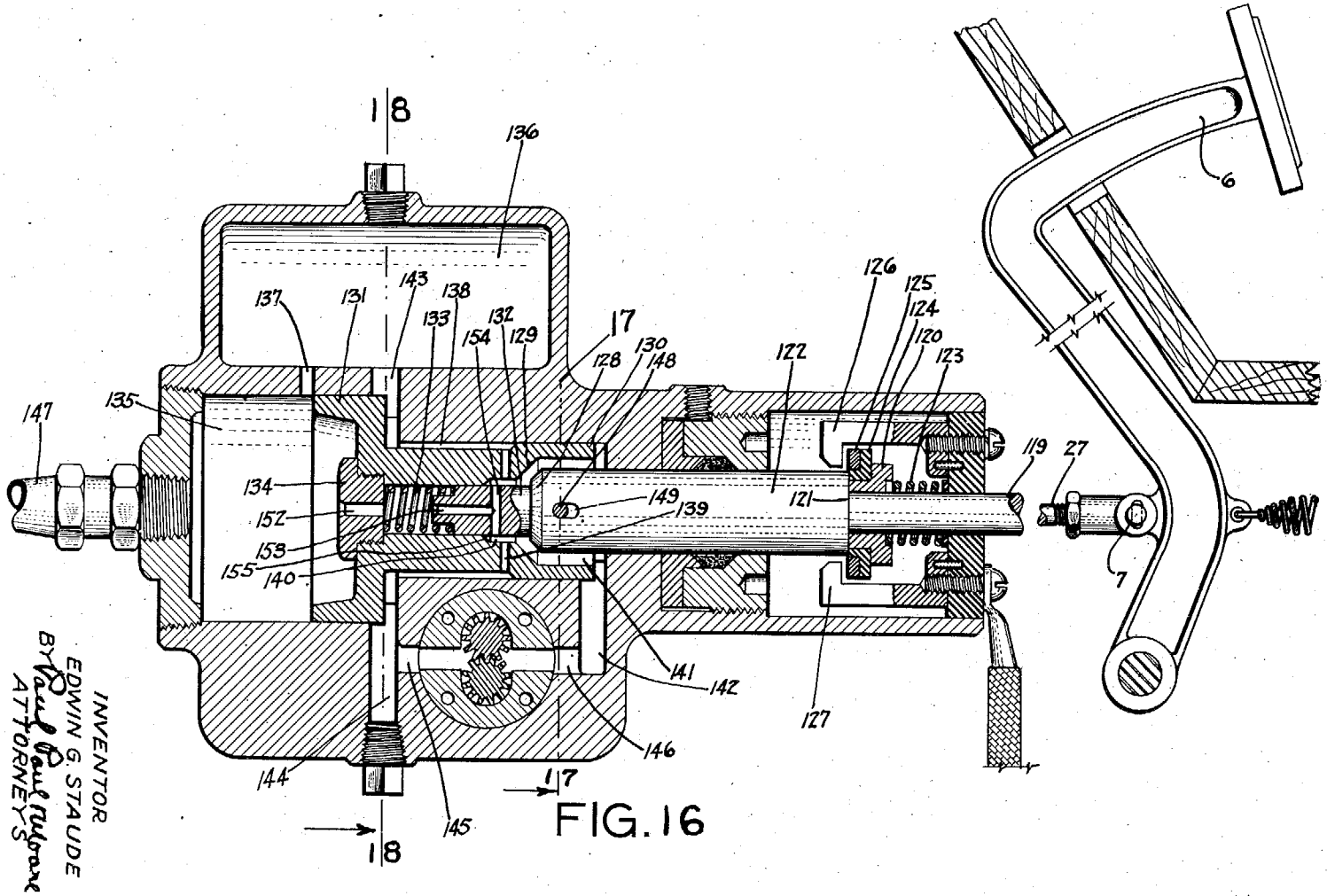
Figure 16 shows a vertical section of a second modified embodiment of my invention, in which the device is applied directly to control the fluid pressure line of the so-called hydraulic brakes.

In Figure 16 the invention is applied to a well known type of hydraulic brake in which the piston is connected in the fluid master cylinder directly with my unit, and also in which provision is made for the usual reservoir for replenishing fluid lost by leakage.

Referring to Figure 16 there is provided the usual pedal 6 and connection 7 and the rod 27, except that the unit is placed on the opposite side of the pedal 6, and a pushing effect is obtained by the action of the pedal. This pushing effect is against the rod 119 which carries a portion of an electrical contact mechanism, the functional equivalent of that shown in Figures 5, 6 and 7. The mechanism includes a sleeve 120 held against the shoulder 121, of the member 122, by a spring 123. The sleeve 120 carries the insulating material 124, and brass ring 125 is adapted to contact with the hooked bars 126 and 127, which are secured to the terminal outlets similar to that described in Figures 4, 5, 6 and 7.

The member 122 corresponds to the valve member having a valve 128 cooperating with a valve seat 129 of the movable member 130. Formed integral with the movable valve seat is a piston 131. The valve member 122 has a reduced portion 132 formed on its inner end, and the valve is adapted to be held in its open position by spring 133 which abuts plug 134 screwed into piston portion 131 of the movable valve seat member 130.

In order to replenish any fluid which may become lost in the cylinder 135, in which the piston 131 operates, a chamber 136 is provided which is connected with the cylinder 135 by a port 137 so that fluid may flow through the opening 137 and into a cylinder and replace any fluid which may have seeped out through the various connections throughout the system while same is under high pressure.

Figure 17:
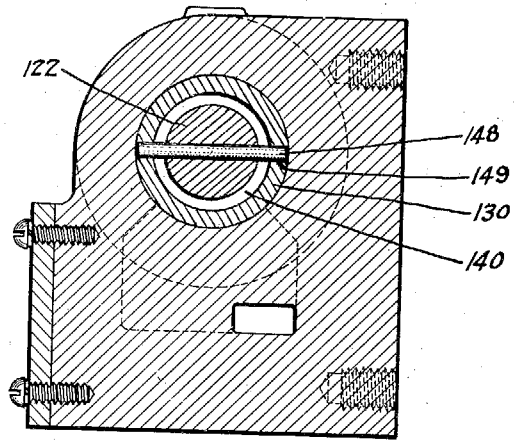
Figure 17 is a cross section on line 17—17 of Figure 16.
Figure 18:
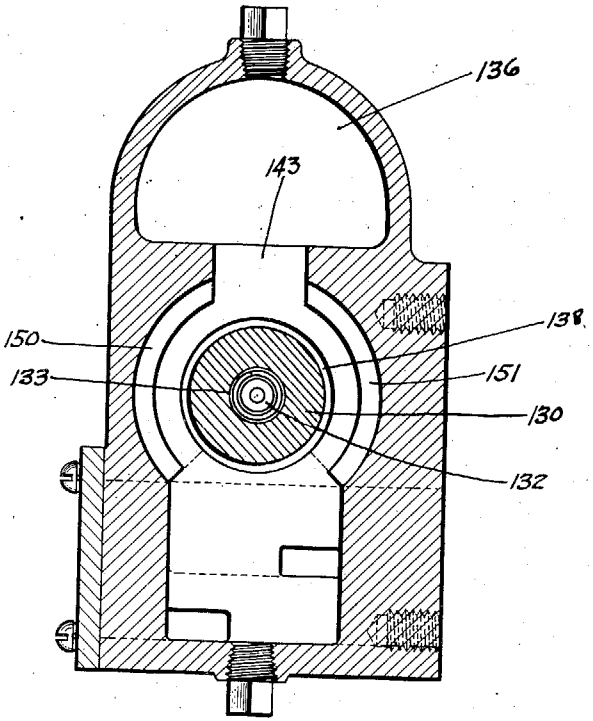
Figure 18 is a cross section on line 18—18 of Figure 16.

The movable valve seat member is reduced to provide a fluid channel 138 as part of the fluid circulating system. There is also provided a cross channel 139 connecting the space 138 with the space 140. Space 140 in turn (when valve 128 is unseated) connects with space 141 connecting with channel 142. The reservoir 136 connects with the channel 143, leading into channel 144. Channel 144 connects with pump gears through channel 145, which pump gears exhaust into channel 146 directly into channel 142. Ordinarily fluid fills the entire system, and if the pump is inactive, movement of the pedal to braking position causes the valve 128 to seat against the valve seat 129, compressing the spring 133, exerting pressure against the piston 131 and compressing the fluid in chamber 135, which results in pressure in the connection 147 to operate the brake. The spring 133 tends to maintain the valve 128 unseated. For the purpose of limiting movement of element 122, there is provided a stop pin 148, operating in a slot 149, see Figures 16 and 17. The piston 131 is also limited in its movement within the cylinder 135 by shoulders 150—151, see Figure 18, so that the passage connecting 143 with 146 will not be obstructed at any time. In order to establish fluid communication between chamber 135 and the reservoir 136, when valve 128 is open, there is provided a passage 152 in a plug 134, and also there is provided a passage 153 in member 132, connected by cross passage 154. Fluid filling the chamber 140 flows through the passage 154 into passage 153 and out through 152. When the valve 128 is closed against the seat 129 the passage 154 is cut off at point 155 so that pressure may be set up in the chamber 135, and this cut off prevents flow through the passages 152, 153, 154.

Figure 16 also illustrates a "push type" brake assistor adapted for hydraulic brakes. In this instance, the "back pressure" force against the pedal 6 is determined by the difference between the cross-sectional area of the members 130 and 122.

Another feature therefore relates to the use in a fluid pressure system of a control element and an obstructing member (see Figure 16) with a third member operable by the control member and operating in a chamber for displacing fluid therefrom, to control a remotely disposed mechanism, and to the provision of a fluid supply reservoir supplying both fluid for the system and for the chamber from which the third member displaces fluid.

Another feature relates (see Figure 16) to the arrangement of the fluid-replenishing passages, respectively connecting the reservoir with the chamber and system, so that the piston is adapted to close the replenishing passage for its chamber at the beginning of a power stroke. An additional feature relates to the provision of passages through the obstructing member 132 and control element 130 establishing communication between the fluid of the circulating system and of the reservoir and of the piston chamber, only when the obstructing member is in an initial unobstructing position.

In Figures 19 to 24 inclusive, there is illustrated a modified form of power means for operating the pump gears 43—44. In this instance there is provided a disk 156 having vanes 157 set at an angle (see Figure 22) to air inlet ports 158. The idea of applying the vacuum principle in the present environment, as well as the constructions set forth, are important features of the invention. A vacuum is created to suck air through ports 158 (see Figure 20) across vanes 157 through chamber 161, ports 160, chamber 159, and through member 162, past ball check valve 163, and through the brass tube 164, which tube is connected as shown in Figure 24, by tube 165 with the intake manifold 166 of a motor 167. Of course, this connection may be made to other suction or vacuum-creating apparatus, either to some other part of the engine, or to means other than the engine.

The carburetor is indicated at 170, the butterfly valve at 171, the butterfly valve operating lever at 172, the accelerator pedal at 173 and the accelerator connecting rod at 174, this rod being as usual connected with the lever 172. When the foot is removed from the throttle pedal 173, the parts assume the position shown in the figure with the butterfly valve closed or substantially closed, and sufficient vacuum is produced to operate the small pump gears at high velocity. It will be understood that when the butterfly valve is open the suction or vacuum effect is reduced so that the turbine 156 is inoperative or operates only at substantially reduced speed.

Figure 20:
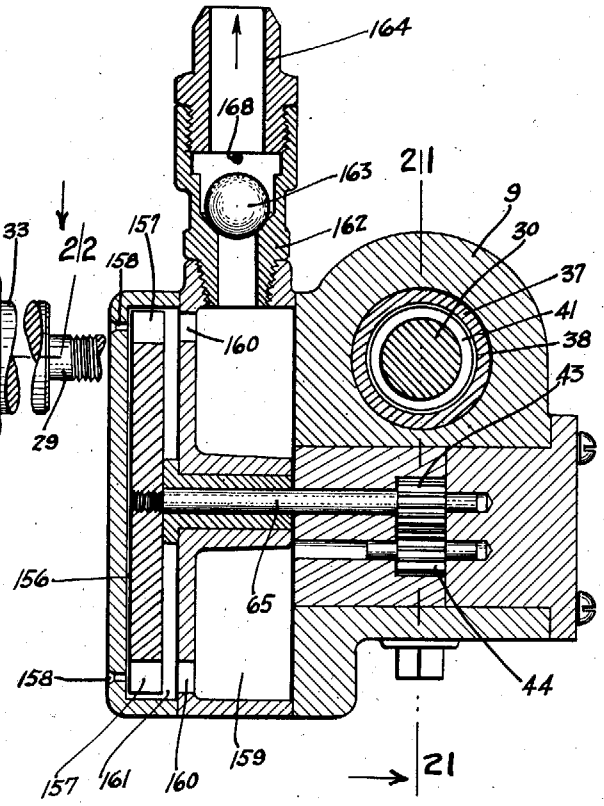
Figure 20 is a section on line 20—20 of Figure 19 looking in the direction of the arrow.
Figure 19:
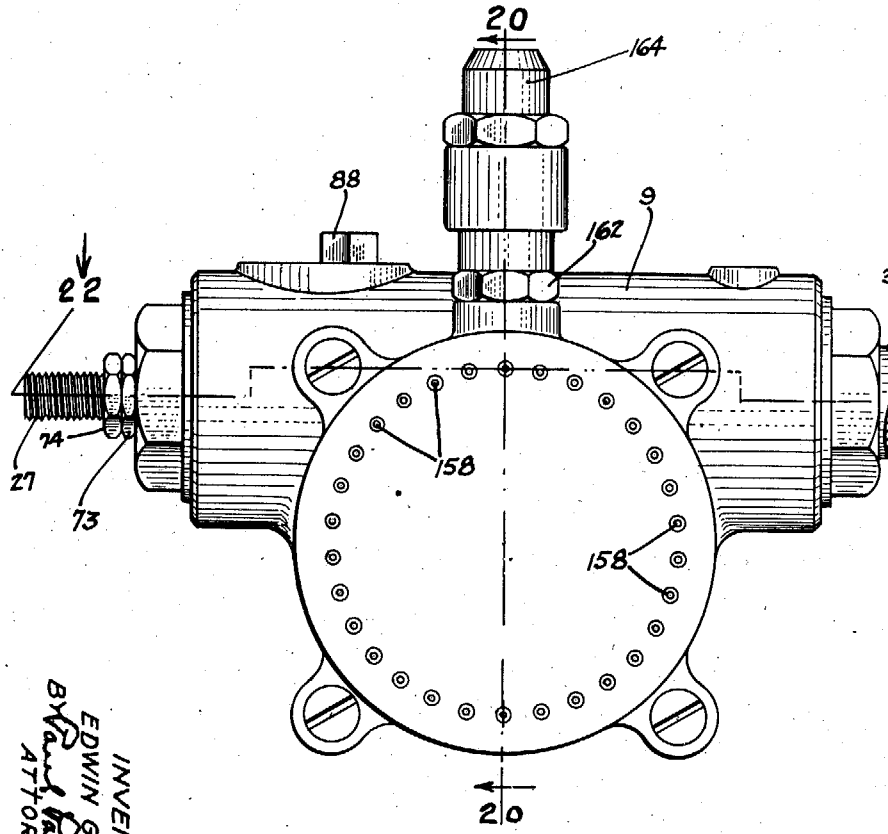
Figure 19 is a side elevation illustrating a third modification embodying my invention, in which the vacuum principle is utilized.
Figure 21:
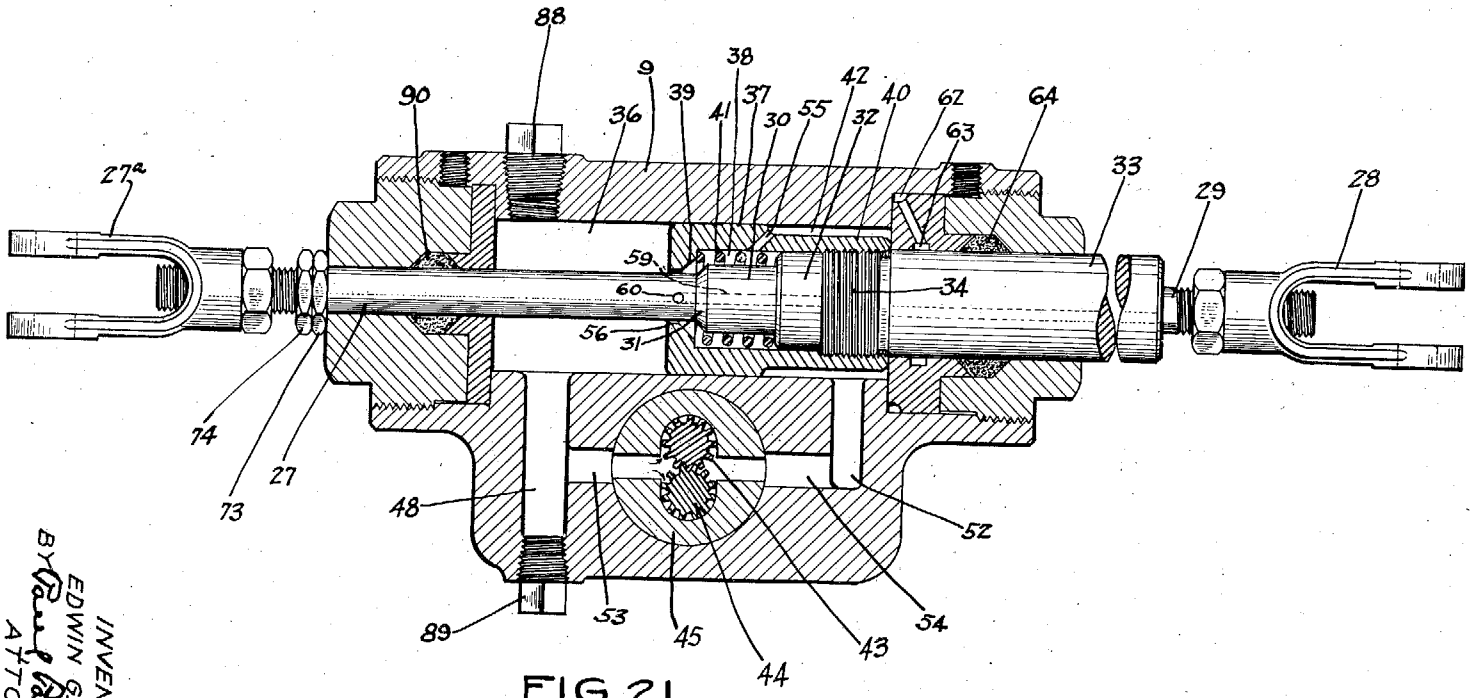
Figure 21 is a vertical section on line 21—21 of Figure 20.

It will be understood that the valve mechanism of the units illustrated in Figures 19 and 20 may be the same as that illustrated in Figure 4, or as that illustrated in Figure 10.

The operation of this vacuum-powdered motor is as follows: The vacuum is created in the pipe 165 when the butterfly valve at the carburetor is closed, and this vacuum ordinarily is about ten pounds per square inch. The ball 163 is raised against the stop 168 to create a vacuum within the chamber 159, which through connection to the ports 160 create vacuum with the space 161. Air rushing through ports 158 open to the atmosphere will blow against the inclined vanes as shown in Figure 22, and cause the disc 156 with the vanes 157 to instantly rotate at high speed and revolve the pump gears 43 and 44. The brakes are seldom, if ever, applied without removing the foot from the accelerator control, and this instantly closes the butterfly valve, and sets up a vacuum sufficient to raise the check valve 163. During normal driving, when the carburetor butterfly valve is partly open the vacuum is not sufficient to raise the check valve 163 and therefore the disc 156 and vanes 157 will not necessarily revolve continually, although there is no objection to the pump revolving continually at low speed when vacuum power is used, since the carburetor adjustment can be made to accommodate this continual flow of air, to properly balance the mixture.

While I have shown my dual fluid power controlling mechanism as applied to assist in setting the brakes on motor vehicles, my invention may, however, be successfully applied to many other uses, especially with the individual electric motor drive.

A salient feature of the invention is the use of a small size, small weight, high velocity motor for obtaining great power by the use of small pump gears operated at high velocity, whereby, among other things, a casing unit of small size and weight, adapted to be connected directly in the brake line, can be had. I do not claim merely the sizes per se but consider the idea of means for unfailingly obtaining sufficient pressure in the fluid system by a leverage system including small pump gears rotated at high velocity, the gears being controlled by means operable at very small cost, and which is of small size and weight such as an electric or vacuum controlled motor. The ideas of means in a single unit connectible in the brake line with the brake line elements including pedal-operable and brake operating connections, connected to be controlled by and to control a single valve in a manner to progressively block circulation in the fluid system and to be fluid-operated to progressively set the brakes is also a valuable feature.

So far as I am aware no one has ever conceived, in an environment of the kind mentioned herein, that great power can be obtained in a small compass by operating very small gears at high velocity by means of a high speed motor of small electrical capacity; nor has anyone conceived that this high velocity operation makes it possible to construct a small size, light weight, self-contained unit, including pressure-controlled means for operating the brakes with the unit directly connectible in the brake line.

Another feature of the invention relates to the compact valving structure of Figure 4 and some of the other figures, wherein the valving element 30 is within the valve seat element 37, and in which the valving element 30 has an enlarged portion 32 against which back pressure acts to separate the elements. This somewhat telescopic relation of the parts permits small diameters and compactness of the valving mechanism and yet provides a construction which is adaptable to very high pressure operation. Another feature is the arrangement of the spring within the telescoped members for normally separating the valving members, as shown in Figure 4.

Another feature relates to the very compact structure of Figure 4 and some of the other figures, providing a very short passage establishing communication between opposite ends of the operating chamber 36, see passages 48, 53, 54 and 52 which may be considered one passage. This is possible because of the use of small pump gears which are placed close to the chamber 36 but outside of it, and is also made possible by the telescopic relation of the parts of the valving means which permits a short stroke and therefore a short operating chamber. This is a highly important feature, in that the shorter the fluid circuit is, the less friction and therefore the less heat there is.

A valuable feature is the use of small gears, thus making compactness possible, and in addition to this and separate therefrom, the provision of a pressure-creating means operable on such a small amount of electric current that the current can be drawn from the ordinary battery without overloading it, notwithstanding the fact that this battery at the same time supplies current for operating a heater, radio, windshield wiper, etc. of the automobile.

Another valuable feature of the invention concerns the arrangement of the valving element 47 in Figure 5 so arranged as to prevent return flow through the passages 52—51 in case of pressure failure or reduction due to failure or malfunction of a pressure-creating means of any suitable kind, whether the fluid power is generated by a power unit operated by a battery or is generated from the engine manifold through a suitable conduit connection. By this means, proper pressure in the operating chamber can be maintained.

I claim as my invention:

1. A brake control comprising a fluid circulating system including intercommunicating passages, a pedal, brake-applying means, a valve member and valve seat member cooperable therewith for controlling flow through the fluid system, one of the members being connected to the pedal and the other to the brake-applying means, small pump gears for controlling pressure in the system, means for operating said gears at high velocity, and means operable by pedal movement to braking position to initiate operation of said gear operating means.

2. A device of the class described comprising passages forming a fluid circulating system, and including a pump adapted to set up pressure in the system, a pedal, a brake mechanism, a valve member, and a seat member for said valve member both movable in a portion of the system and cooperable to block fluid circulation, one element being adapted to be moved by the pedal to block circulation, and the other adapted to be moved as the result of blocked circulation to re-establish circulation and to move the brake mechanism to apply the brakes as the result of such circulation re-establishing motion, means adapted to operate said pump at high velocity, means operable by pedal movement to braking position to initiate operation of said gear operating means, said valve and seat means being cooperable in a manner to obtain manual application of braking pressure, and a valve controlled by-passage as a part of said system adapted to relieve pressure in case the gears become inoperative and block fluid circulation.

3. A unit including a fluid pressure system having associated therewith one movable linkage element adapted to be connected to a controlling means and another movable linkage element movable independently of the first and adapted to be connected to a means to be controlled, valve means in the pressure system adapted to control fluid flow therein, and controlled by one linkage element and controlling the other, a gear pump for setting up pressure in the system, motive means adapted to drive said pump, means adapted to be operated as the result of motion of one of the linkage elements to activate the motive means, said unit being mounted on a common base, being adapted to be connected as a link.

4. A device of the class described comprising a fluid pressure system having associated therewith one movable element adapted to be connected to a controlling means, and another movable element movable independently of the first and in a direction axially thereto adapted to be connected to a means to be controlled, valve means in the pressure system adapted to control fluid flow therein and controlled by one of the elements and controlling the other, pump means for setting up pressure in the system, motive means adapted to drive the pump means, and means adapted to activate the motive means as result of motion of one of the elements.

5. In a braking effort amplifying device, a casing having fluid passages, means for producing fluid pressure, valve means in one of the passages for controlling the fluid pressure and against which it acts including two movable elements one within the other and both projecting beyond the casing at one side, a lever against which one of the elements acts to operate brakes, a second lever mounted on one of the elements and adapted to move the other to close the valve and a motor for operating the fluid pressure producing means.

6. In a braking effort amplifying device, a casing having fluid passages, means for producing fluid pressure, valve means in one of the passages for controlling the fluid pressure and against which it acts including two movable elements both projecting beyond the casing at one side, a lever mounted on one of the elements and adapted to move the other to close the valve, a motor for operating the fluid pressure producing means, and means operated as the result of motion of one of the elements to close the valve, to initiate motor operation.

7. In a braking effort amplifying device, a casing having fluid passages, small pump gears for setting up fluid pressure, valve means in one of the passages for controlling the fluid pressure and against which it acts including two movable elements one within the other and both projecting beyond the casing at one side, a lever against which one of the elements acts, a second lever mounted on one of the elements and adapted to move the other to close the valve and a small high speed electric motor carried by the casing and having such electrical capacity that it can be operated on a small expenditure of electrical energy by an ordinary automobile battery, means directly connecting the motor for operating the gears, whereby high pumping pressure can be substantially instantly obtained upon energization of the high speed motor.

8. In a braking effort amplifying device, a casing having fluid passages, small pump gears for setting up fluid pressure, valve means in one of the passages for controlling the fluid pressure and against which it acts including two movable elements one within the other and both projecting beyond the casing at one side, a lever against which one of the elements acts, a second lever mounted on one of the elements and adapted to move the other to close the valve and a small high speed electric motor carried by the casing and having such electrical capacity that it can be operated on a small expenditure of electrical energy by an ordinary automobile battery, means directly connecting the motor for operating the gears, whereby high pumping pressure can be substantially instantly obtained upon energization of the high speed motor, and means operated as the result of motion of one of the elements to close the valve, to initiate motor operation.

9. In a power actuator mechanism having an operating chamber, means for normally causing the circulation of fluid through said operating chamber, valve means in the operating chamber for controlling the fluid circulation, including two movable elements, one within the other, and both projecting beyond the chamber at one end, a lever against which one of the elements acts, and a second lever mounted on one of the elements and adapted to move the other to obtain closure of the valve means for the purpose specified, the fluid being circulated through one of said movable circulation-controlling elements.

10. A power actuator mechanism comprising a fluid system, a pedal, a brake, a movable valve member and a movable valve seat member cooperable therewith for controlling fluid flow in the system and against which fluid acts to transmit power, means by which one of the members is operated by the pedal and means by which the other controls the brake, means for controlling fluid pressure in the system, and means operable as a result of pedal movement to braking position to cause the pressure controlling means to initiate fluid pressure.

11. In a power mechanism a chamber and piston therein for displacing fluid therefrom, a fluid circulating system, a fluid supply reservoir for the system and chamber, fluid replenishing passages respectively connecting the reservoir with the chamber and system, said piston being adapted to close its supply passage at the beginning of its power stroke, a control element responsive to pressure in the circulating system and adapted to move the piston, and a member cooperative with said control element for obstructing circulation to obtain a power movement of the piston.

12. In a power mechanism, a chamber and piston therein for displacing fluid therefrom, a fluid circulating system, a fluid supply reservoir for the system and chamber, fluid replenishing passages respectively connecting the reservoir with the chamber and system, said piston being adapted to close its supply passage at the beginning of its power stroke, a control element responsive to pressure in the circulating system and adapted to move the piston, a member in telescopic relation with said control element and having means for obstructing circulation to obtain a power movement of the piston.

13. In a power mechanism a chamber and piston therein for displacing fluid therefrom, a fluid circulating system, a fluid supply reservoir for the system and chamber, fluid replenishing passages respectively connecting the reservoir with the chamber and system, said piston being adapted to close its supply passage at the beginning of its power stroke, a control element responsive to pressure in the circulating system and adapted to move the piston, a member in telescopic relation with said control element and cooperative therewith for obstructing circulation to operate the control element to obtain a power movement of the piston, a spring for normally maintaining the obstructing member in unobstructing position, and passages through said obstructing member, control element and piston establishing communication between the fluid of the circulating system and reservoir, and the piston chamber only when the obstructing member is in an initial unobstructing position.

14. In combination with an automobile having a brake pedal bracket, a brake pedal operating the shaft and brake means, a casing, rotatably adjustable link means connecting the casing to the bracket, said casing providing an operating chamber and a fluid pressure system of which the chamber is a part, a two-part valve means movable in the chamber, the parts projecting beyond the chamber at opposite ends and one being adapted to obstruct flow to cause motion of the other, means connecting one part to the pedal, means connecting the other part to the brake, said link means holding the casing against motion by said last mentioned means, and means for controlling circulation of fluid in the system.

15. In combination with an automobile having a brake pedal, and supporting bracket therefor, and a brake, a unit comprising a casing providing a fluid pressure system having associated therewith aligned linkage elements one connected to the pedal, and another connected to the brake, each linkage element controlling a valving element, one element being cooperable with the other to obstruct flow in the system to cause the fluid to move the other to obtain braking force, rotatably adjustable link means connecting the casing to the bracket to hold it against motion, and means for setting up pressure in the system.

16. In combination with an automobile having a brake pedal, a brake, and a brake shaft having a lever, an operating chamber having a fluid pressure system, a piston operable in the chamber and having an extension projecting from the chamber and engaging said lever for moving it to brake applying position when the piston is pressure-moved, said piston having passages as part of the circulating system, a valve member slidable in the piston and also projecting from the chamber at the same side as the piston extension and adapted to modulatingly obstruct fluid flow to cause the fluid to act to move the piston so as to obtain increasing degrees of reaction pressure according to the degree of advance of the piston, a lever of the first class pivotally mounted on the piston at the outside of the chamber and having one arm adapted to operate the valve, and means connecting the other arm to the pedal so that when the pedal is moved in braking direction to obstruct the flow the piston moves forwardly generally in the same direction as braking movement of the pedal.

17. A device of the class described comprising a fluid pressure system including an operating chamber and means for creating pressure in the system, a first pressure movable control element in the operating chamber and connectible with a control device, a second pressure operable control element in the operating chamber and connectible with the device to be controlled, said system including passages by which fluid is delivered to the chamber to react upon the elements to move them, and means operable as a result of motion of one of the elements to operate the pressure-creating means to create pressure.

18. A device of the class described including an engine manifold, a fluid pressure system including an operating chamber, means by which power generated by manifold fluid is multiplied and applied for creating a pressure in the system, a first pressure movable control element in the operating chamber and connectible with the control device, a second pressure control element in the operating chamber and connected with the device to be controlled, said system including passages by which fluid is delivered to the chamber to react upon the elements to move them.

19. A power actuator having a fluid pressure system including an operating chamber, means movable in the chamber adapted to control fluid pressure and against which the fluid pressure acts to transmit power, means for creating fluid pressure, and means for automatically operating the pressure-creating means to create pressure as a result of fluid pressure control motion of said fluid pressure control means.

20. A power actuator having a fluid pressure system including an operating chamber, cooperating valve and valve seat elements movable in the chamber one within the other and adapted to control fluid pressure and against which fluid pressure acts to transmit power, the valve element having an enlarged portion facing toward the seat of the valve seat element against which pressure acts to modify the power transmitting action of said elements, manual means for moving said valve element to initiate transmission of power and means connected to be controlled by the seat element, the power initiating movement of the valve element being in the same direction as the movement of the seat element when the latter moves to transmit power.

21. A power actuator having a fluid pressure system including an operating chamber, cooperating valve and valve seat elements movable in the chamber one within the other, and adapted to control fluid pressure and against which fluid pressure acts to transmit power, the valve element having an enlarged portion opposed to the seat of the valve seat element against which back pressure acts to separate the elements, a spring within the seat element for normally separating said elements, manual means for moving said valve element against the action of the spring to initiate power, and means connected to be controlled by the seat element; the power-initiating movement of the valve element being in the same direction as the movement of the seat element when the latter moves to transmit power.

22. A liquid power actuator mechanism comprising, a member for operating a device to be controlled, power input controlling means, a power output member adapted to actuate said device-operating member, said output member having an operating chamber and passages for circulating liquid, intermittently operable means for generating liquid pressure in said passages and operating chamber, valve means operated by said input controlling member and located in the operating chamber for controlling the circulation of liquid including two movable elements one within the other and one of which is the output member, said input controlling means including a lever having an arm acting directly on one of the valve means elements to move said element to obtain application of power pressure against the output member and such that the device-operating member is only moved as a result of the movement of the power actuated mechanism after said valve means has operated.

23. A liquid power actuator mechanism comprising, a member for operating a device to be controlled, a power input controlling member, a power output member adapted to actuate said device-operating member and having therewithin an operating chamber, an intermittently operating liquid pressure pump controlling liquid flow through said chamber, a liquid pressure controlling valve within said operating chamber and operated by said input controlling means, a spring acting for normally holding the valve in position to prevent application of fluid pressure against said output member, said valve being adapted for initial movement against liquid pressure and against spring pressure to obtain application of such pressure, and being adapted to so move before said device-operating member is moved.

24. A liquid actuator mechanism comprising a member for operating a device to be controlled, power input controlling means, a power output member adapted to actuate said device-operating member and having a pressure-operating chamber, an intermittently operable pump for generating liquid pressure in said chamber, passages by which the pump circulates liquid through said chamber, the said liquid passing through said output actuating member and into the output member operating chamber, a valve within the output member, said valve operable by said input controlling means, a spring acting for normally holding the valve positioned to prevent liquid pressure against the output member, said valve adapted for independent initial movement against pressure flow and against spring pressure to a position which causes pressure to be applied against the output member, said valve being so positioned before any motion of said device-operating member takes place.

25. A liquid power actuating mechanism comprising, a member for operating a device to be controlled, power input controlling means, a power output member adapted to actuate said device-operating member, a fluid pressure circulating system including a pressure-operating chamber for said output member, passages for said fluid pressure circulating system through said output member and into said operating chamber, a valve operated by said input controlling means and reciprocable within said output actuating member and controlling the circulating passages for controlling pressures against the output member, said valve having an area exposed to pressure in a passage connecting with the output operating chamber for causing automatic movement of the valve to a position to prevent pressure against the output member and to prevent pressure over-run against said member, a spring acting against said valve for normally holding it to prevent pressure, said valve and said exposed area thereof being adapted for initial movement against fluid pressure, and against spring pressure to initiate application of pressure against said output member being made to occur before any motion of said device-operating member.

26. A liquid power actuator mechanism, comprising a member for operating a device to be controlled, power input controlling means, a power output member adapted to actuate the said device-operating member, a pressure-operating chamber for said output member, a liquid pressure circulating system including said chamber, a valve operated by said input controlling member for controlling application of pressure by said circulating system against said output member, said valve having an independent initial movement in a direction towards the direction of flow and in opposition to the force of the liquid applied to operate the valve, and being adapted to make such initial movement before moving said device-operating member, a spring for normally keeping the valve in inactive position, a second chamber, and a third member connected to the liquid output member and operating in said second chamber for displacing liquid therefrom.

27. In a liquid power actuator mechanism including, a member for operating a device to be controlled, a pressure system including an inelastic fluid pump, a movable power input controlling means, a movable power output member adapted to actuate said device-operating member, and operated by pressure set up in said system, an electric motor for driving the pump, a circuit for said motor including a switch, and means by which a moving part of the power input means automatically controls the switch.

28. In a liquid power actuator mechanism, a member for operating a device to be controlled, a power output member, an input member for controlling said output member, said input member being concentrically and operatively related to said output member, an intermittently controlled elastic fluid pump and circulating system therefor for creating inelastic liquid pressure and applying it against said output member and means responsive to the movement of the input member for automatically starting and stopping said pump.

29. In a liquid power actuating mechanism, a source of liquid pressure differing from the atmosphere, a power output member, an input member for controlling said output member, said input member including a valve having an area exposed to liquid pressure, said output member having an output chamber in which said valve operates for controlling the application of liquid pressure against the output member, said valve and exposed area being slidably mounted within the output member and being adapted for independent initial movement in a direction opposite to pressure flow of the liquid to initiate application of liquid pressure against said output member, said output member having an operating chamber, and a communicating passage between said chamber and the valve chamber whereby the pressure in the output chamber is applied to said exposed area of the valve thereby controlling the degree of pressure in the output chamber and against the output member, the pressure against the valve being adapted to maintain regulated pressure in the output chamber.

30. A liquid power actuator comprising, an input controlling member and a liquid output actuating member controlled thereby, a chamber from which said output member forces liquid, an intermittently operable pumping system including a pump for creating inelastic liquid pressure against said liquid output actuating member, an electric motor for driving said pump, a circuit for the motor including a switch, means by which a moving part of the input member controls the switch, the liquid pumping system and said chamber having a common source of liquid supply.

31. In a hydraulic power actuator in combination, a controlling member, an electric motor, a pump operated thereby, an actuator member adapted to be moved by hydraulic pressure from said pump, a valve for controlling the flow from said pump to said actuator, a switch controlling the operation of said motor, including means operative to automatically maintain pressure during actuation of said controlling member and said device, said means including a moving part of said actuator.

32. In a liquid power actuator, an input controlling member and an output actuating member controlled thereby, an inelastic fluid pump for generating inelastic fluid pressure and adapted to start and stop, and automatically controlled by a moving part of the input member, said input member including a valve slidably mounted in a valve chamber within the output actuating member.

33. A liquid power actuator comprising an input controlling member and an output actuating member including a single acting piston controlled thereby, an inelastic fluid pump for creating inelastic fluid pressure and means controlled by a moving part in the input member to start and stop said pump, said input member including a valve slidably mounted in a valve chamber within the output actuating member and adapted for delivering modulated pressure only to one side of said single acting piston of said output actuating member.

34. In a liquid power actuator, means manually operable to create pressure, and power means operative in response to pressure requirements for creating additional pressure, said power means including an inelastic fluid pump, an electric motor, an electric circuit therefor, including a switch, said switch being automatically controlled by a moving part in the manual means.

35. In a liquid power actuator, an input controlling member and a movable output actuating member controlled thereby, a pressure operating chamber for said output member having a valve chamber, said input member including a valve within the output actuating member having an area exposed to liquid pressure in the valve chamber, said valve adapted for controlling pressure against the output actuating member, said valve being slidable in said communicating passage between the output actuating chamber and the valve chamber, whereby pressure in the output actuating chamber is communicated to the exposed area of the valve and against valve pressure applying movement to balance and hold said pressure constant against proportional manual effort on the input controlling member and to assist in reducing said pressure in the output actuating chamber when the effort on the input controlling member is reduced.

36. In a liquid power actuator mechanism, an input controlling member and an output actuating member controlled thereby, an intermittently operable mechanism for generating liquid pressure, an operating chamber on the pressure side of the output actuating member, said output actuating member being slidably mounted but pressure tight within a fixed passage, a valve chamber within said output actuating member, a valve slidably mounted within said valve chamber and adapted for additional independent motion when actuated by the input controlling member and moved against pressure and in direction opposite to the direction of pressure of the liquid, said input controlling member including means for moving said valve in a direction opposite to that of the direction of the power movement of said input member.

37. In a power mechanism, a fluid circulating system, a control element responsive to the pressure in the system, a member for obstructing circulation to move the control element, a spring for normally keeping the obstructing member in unobstructing position, a chamber and a third member connected to the control element and operating in the chamber for displacing fluid therefrom, a supply reservoir normally in open communication with said chamber and said fluid circulating system, and said communication adapted to be closed by a position of the third member, to interrupt the supply to said chamber.

38. A device of the class described comprising a fluid pressure system including an operating chamber and means for creating pressure in the system, a control device, a first pressure movable control element movable in the operating chamber and adapted to be connectible with the control device, a second pressure movable control element in the operating chamber and connectible with the device to be controlled, said system including a passage by which fluid is delivered to the chamber to react upon the elements to move them, and including a passage for exhausting fluid from the chamber after acting on and as a result of movement of one of the elements, and a by-pass, having a check valve therein, around the pressure creating means between the exhausting passage and the delivery passage operable to prevent return flow therethrough in case of pressure failure or reduction due to failure or mal-operation of said pressure-creating means.

39. A control for power propelled vehicles comprising a fluid pressure system including an operating chamber and means for creating pressure in the system, a pedal, a mechanism to be controlled, a first control element in the operating chamber and connected for operation by the pedal, a second control element also in the operating chamber and connected to control the mechanism, said system having a passage by which fluid is delivered to the chamber to react upon said elements to move them and also having a passage for exhausting the fluid from the chamber after acting on the elements, and a by-pass, having a check valve therein, around the pressure creating means between the exhausting passage and the delivery passage operable to prevent return flow therethrough in case of pressure failure or reduction due to failure or mal-operation of said pressure creating means.

40. A device of the class described comprising a fluid pressure system including an operating chamber, two control elements movable in the operating chamber between which the fluid reacts to move the elements, said pressure system including passages by which the fluid is respectively delivered to and exhausted from the operating chamber, and a by-pass, having a check valve therein, around the pressure creating means between the exhausting passage and the delivery passage adapted to conserve the pressure in the operating chamber in case of failure of pressure.

41. A compact linkage unit comprising a casing having a fluid circuit including an operating chamber, the remaining part of which circuit is disposed in the casing laterally of the chamber, and two elements movable in the chamber one within the other to obstruct liquid flow through the circuit and having portions respectively projecting at opposite ends of the casing for connection with other linkage elements, one of said elements being adapted to transmit power when the other is moved to obstruct the flow, an intermittently operating gear pump adapted to be operated when the power from the fluid is applied by manual actuation, having small gears arranged to set up pressure and a small high speed motor also carried by said casing and directly connected for operating said gears.

42. In a device of the class described, a manual controlling means, a fluid circulating system, intermittently operating small pump gears for setting up pressure in the system, adapted to be operated upon actuation of said controlling means, a small high speed motor directly connected to operate the pump gears, said circulating system comprising two valving elements adapted to be closed and movable in the circulating system, said elements, when closed, serving to obstruct the flow and build up pressure which acts against one of the valving elements to cause it to transmit power, and which reacts against the other valving element to cause it to transmit power which may be sensed by one operating the manual controlling means, the direction of motion of said controlling means to obstruct the flow being the same as the power transmitting motion of said one valve element.

43. In a power actuator mechanism having a fluid circulating system including a pump for creating pressure therein, an obstructing valve and an operating chamber with an actuating member therein, said chamber and actuating member forming parts of said fluid circulating system, a control device for said valve, unseating of said valve establishing communication through said actuating member with the low pressure side of the pressure system, said valve adapted to close in a direction in opposition to the force exerted on the valve by the fluid, manual means having linkage connections with said control device, one of the elements of said connections controlling said obstructing valve and being operable upon reaction in the linkage connections to cause the valve to obstruct circulation as it leaves the operating chamber, said actuating member when pressure-moved, moving in the same direction as the movement of said control device to obstruct the flow.

44. In a hydraulic power actuator in combination, an electric motor and circuit therefor including a switch, a circulating system and a high speed pump for creating pressure therein, a member in said system against which the fluid pressure acts, a controlling valve for controlling pressure against said member, mechanism for operating the valve, and means including a movable part actuated as a result of the movement of said valve actuating mechanism to automatically operate said switch.

45. A liquid power actuator, comprising a manually actuated input controlling member and a liquid output actuating member controlled thereby, a chamber from which said output member forces liquid, an intermittently operable pumping system adapted to be started by the manual actuation of said input controlling member, including a pump for generating liquid pressure against said output actuating member, said system and said chamber having a common source of liquid supply.

46. A liquid power actuator, comprising a manually actuated input controlling member and an output actuating member controlled thereby, a chamber in which said output member operates, an intermittently operated pump for creating inelastic fluid pressure adapted to be started by the manual actuation of said input controlling member, a liquid circuit for said pump, said liquid circuit returning to the intake side of said pump between the output actuating member and the wall of the chamber.

47. A liquid actuator, comprising a manually actuated input controlling member and an output actuating member controlled thereby, an intermittently operative liquid pump for generating pressure against said output actuating member, adapted to be started by the manual actuation of said input controlling member, a fluid circuit for said liquid pump, a valve for controlling the pressure generated by said pump, and a check valve for automatically permitting free circulation of the liquid in the event said fluid pump is stalled, and said output actuating member is operated manually by said input controlling member.

EDWIN G. STAUDE.